United States Patent
Murai et al.

(10) Patent No.: US 6,478,671 B2
(45) Date of Patent: Nov. 12, 2002

(54) AIR-CONDITIONING SYSTEM

(75) Inventors: Atsuro Murai, Kariya (JP); Koichi Ito, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/874,780

(22) Filed: Jun. 5, 2001

(65) Prior Publication Data

US 2002/0004367 A1 Jan. 10, 2002

(30) Foreign Application Priority Data

Jun. 6, 2000 (JP) ........................... 2000-169155
Sep. 18, 2000 (JP) ........................... 2000-282258

(51) Int. Cl.$^7$ ............................................ B60H 3/00
(52) U.S. Cl. ................ 454/156; 454/160; 454/261; 454/265
(58) Field of Search .................. 454/121, 126, 454/160, 156, 261, 263, 264, 265, 269

(56) References Cited

U.S. PATENT DOCUMENTS

| | | | | |
|---|---|---|---|---|
| 2,400,617 A | * | 5/1946 | Wheller | 165/166 |
| 5,368,521 A | * | 11/1994 | Koenig | 454/261 |
| 5,463,967 A | * | 11/1995 | Gielow et al. | 111/104 R |
| 5,632,675 A | * | 5/1997 | Kanninen et al. | 454/229 |
| 5,954,578 A | * | 9/1999 | Takasaki | 165/42 |
| 6,106,386 A | | 8/2000 | Schwarz | |
| 6,139,425 A | * | 10/2000 | Yazici et al. | 454/261 |

FOREIGN PATENT DOCUMENTS

JP          A-4-95520          3/1992

* cited by examiner

*Primary Examiner*—Derek Boles
(74) *Attorney, Agent, or Firm*—Harness, Dickey & Pierce, PLC

(57) ABSTRACT

An air-conditioning system alternately produces a cooled air stratum and a heated air stratum as viewed from an air outlet opening, and the guide length a1 of a first guide wall is set from 0.05 time or more to 0.5 times or less than the length L1. The guide length a2 of a second guide wall is set from 0.05 time or more to 0.5 times or less than the length L2. Consequently if the air mixing chamber has a small capacity (the length parallel to the direction of air flow), it is possible to mix the heated air and the cooled air sufficiently.

12 Claims, 18 Drawing Sheets

10:AIR MIXING CHAMBER       103:AIR OUTLET OPENING
101:FIRST AIR INLET OPENING  104,105:GUIDE WALLS
102:SECOND AIR INLET OPENING

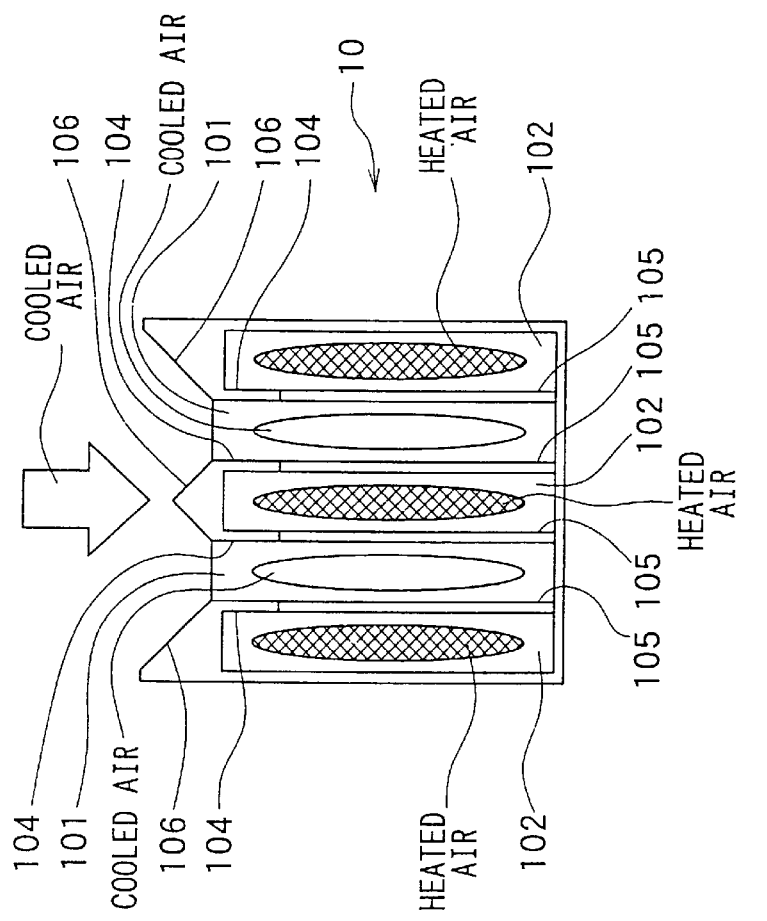
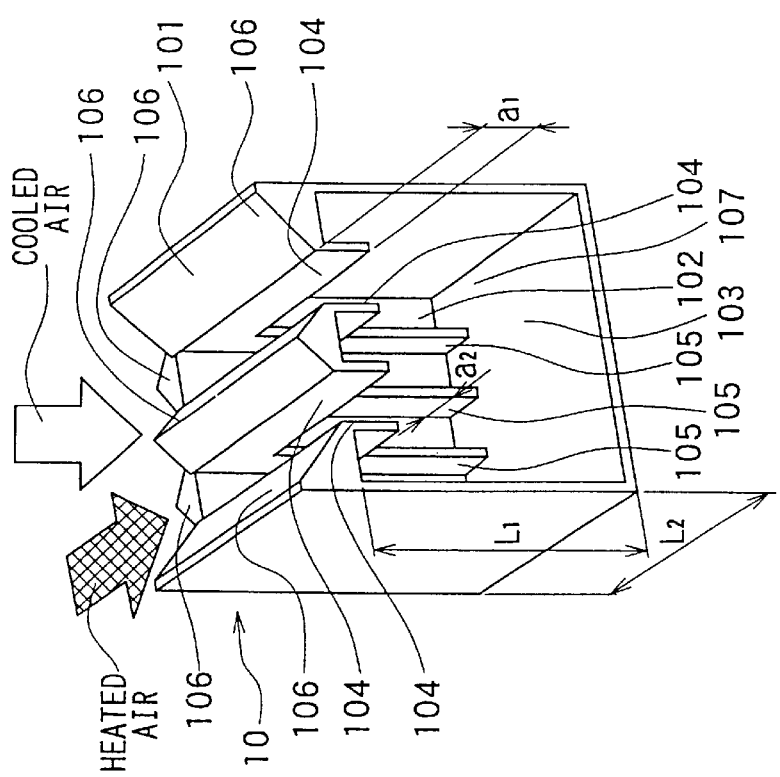

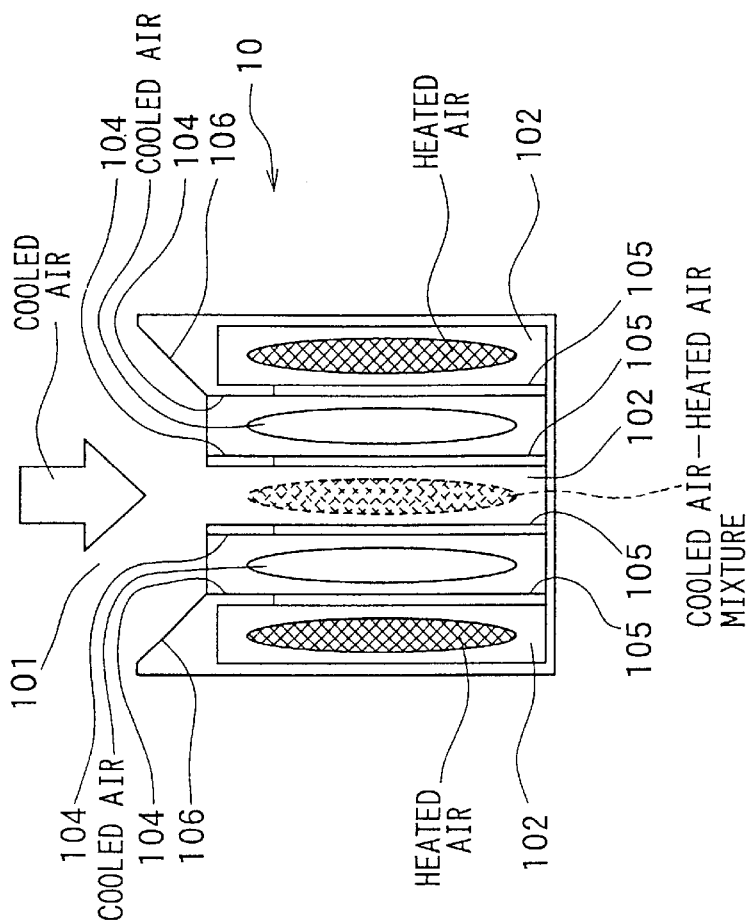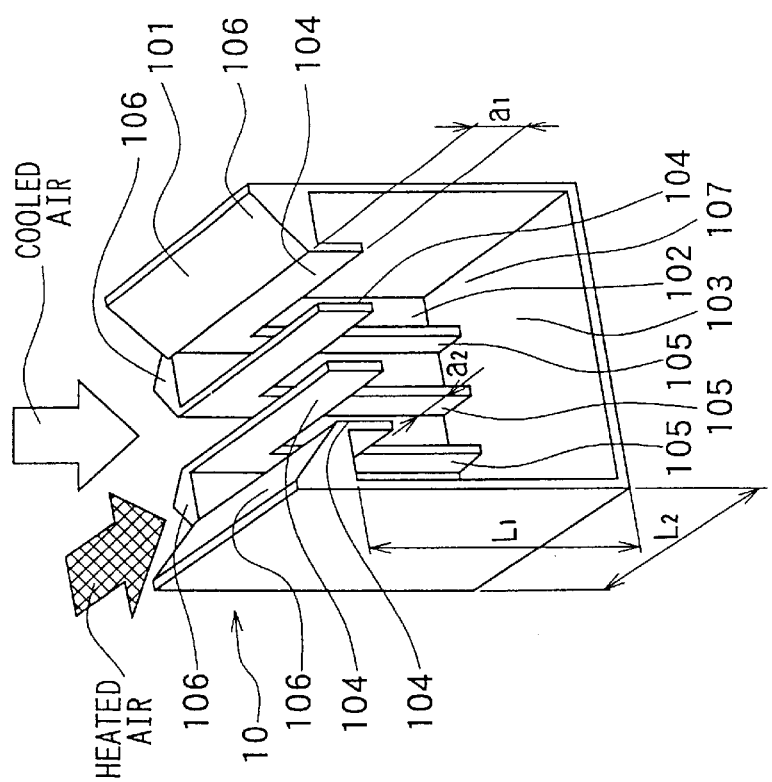

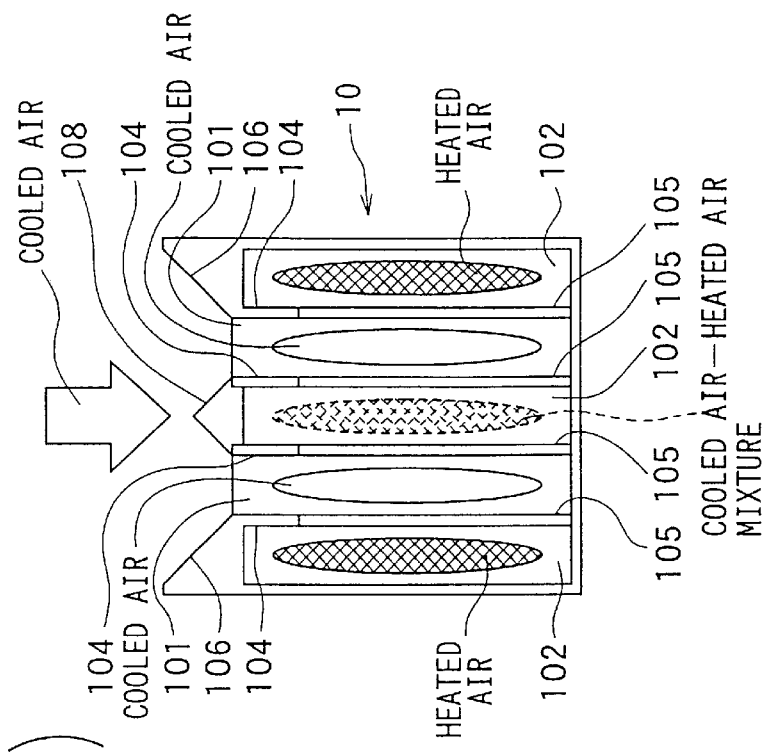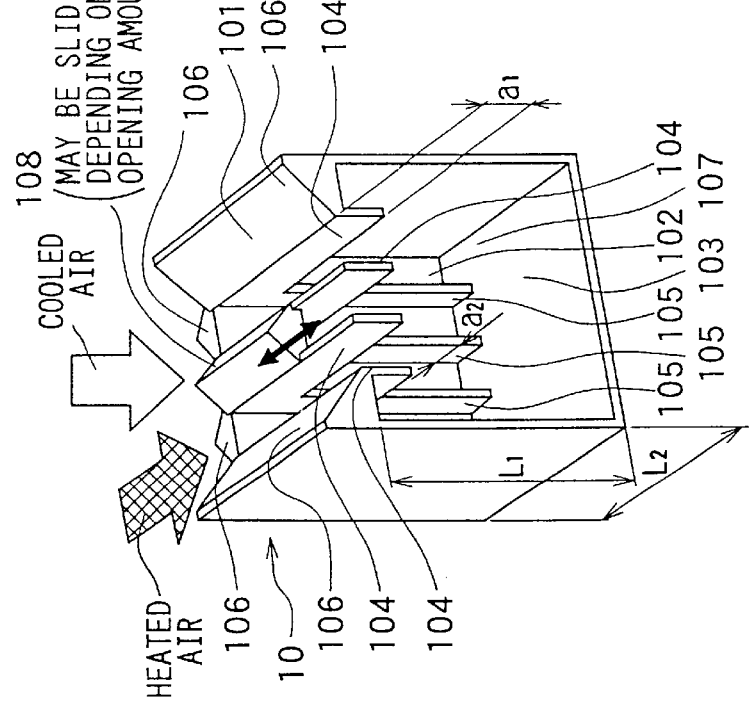

AT 80 TO 170 deg.

UNDER 80 deg.

AT 80 deg.

JETS OF COOLED AIR AND HEATED AIR HIT AFTER PASSING STRATA

FLOW OF MAIN STREAM OF
COOLED AIR AND HEATED AIR
($\gamma = 0°$)

$-40° \leqq$ BLOW-OUT DIRECTION: $\gamma \leqq 40°$

FLOW OF MAIN STREAM OF
COOLED AIR AND HEATED AIR

BLOW-OUT DIRECTION: $\gamma \leqq -40°$
$40° \leqq$ BLOW-OUT DIRECTION: $\gamma$

AIR-CONDITIONING SYSTEM

CROSS-REFERENCE TO RELATED APPLICATIONS

The present invention is related to Japanese patent applications No. 2000-169155, filed Jun. 6, 2000; and No. 2000-282258, filed Sep. 18, 2000, the contents of which are incorporated herein by reference.

BACKGROUND OF THE INVENTION

1. Field of the Invention

The present invention relates to an air-mixing air-conditioning system, and more particularly, to an air-mixing air-conditioning system which controls the temperature of air blown into a vehicle interior after mixing the first air stream and the second air stream which differ in temperature.

2. Description of Related Art

In the air-mixing air-conditioning system of for example the invention disclosed in JP-A No. Hei 4-95520, an air stratum where the heated air flows (heated air stratum) and an air stratum where the cooled air flows (cooled air stratum) are alternately produced at an air mixing chamber to thereby insure proper mixture of the heated and cooled air streams.

The inventors examined this invention, finding that the heated and cooled air cannot be fully mixed in small volume air mixing chambers (air-conditioner casing) (particularly the length parallel with the direction of air flow).

SUMMARY OF THE INVENTION

In view of the above-described disadvantage, it is an object of this invention to provide an air-conditioning system capable of properly mixing the heated air and the cooled air even when the volume of the air mixing chamber (air-conditioner casing) (particularly the length parallel with the direction of air flow) is small.

To attain the above object, the air-conditioning system according to this invention is an air-mixing air-conditioning system capable of controlling the temperature of the air blown into the vehicle interior by mixing the first air stream and the second air stream which differ in temperature. The air-conditioning system has an air mixing chamber having a first air inlet opening at which the first air stream enters, a second air inlet opening which opens in a direction intersecting the first air inlet opening to take in the second air stream, and an air outlet opening 103 at which the first air stream entering at the first inlet and the second air stream entering at the second inlet flow out. Guide walls are provided that divide the first and second air inlet openings 101 and 102 into a plurality of ports and extend in a direction parallel to the air flow. The air mixing chamber is so constructed that at least one of the first and second air streams hits against the inner wall of the air mixing chamber 10 and then flows, after changing its direction of flow, to the air outlet opening. The guide walls are formed so that, as viewed from the air outlet opening, the air stratum of the first air stream and the air stratum of the second air stream are generated alternately. Furthermore, of the guide walls, the guide wall which guides the hitting air stream hitting the inner wall of the air mixing chamber is characterized in that its guide length a1 is 0.05 times or more and 0.5 times or less than the size L1.

The guide walls are provided to alternately produce the cooled air stream and the heated air stream as viewed from the air outlet opening 103 side. This construction improves the performance of mixing both air streams by increasing the contact surface area of the first and second air streams.

To reliably improve the air mixing performance, therefore, it is necessary to allow the flow of the first and second air streams into the air mixing chamber 10 with the two kinds of air strata reliably formed.

If in this case the guide length a1 and a2 of the guide walls is small, the first and second air streams go into the air mixing chamber without an air stratum formed, failing in the improvement in the air mixing performance.

Contrarily, if the guide lengths a1 and a2 of the guide walls are excessively large, the volume of the space (particularly the length parallel with the direction of air flow) in the air mixing chamber for mixing the air streams will decrease, resulting in insufficient mixture of the first and second air streams.

The air mixing performance can be improved as described later by setting the guide length a1 of the guide wall 104 which guides the hitting air stream like this invention.

Furthermore, the guide wall guides the non-hitting air stream of the first and second air streams flowing toward the air outlet opening side without hitting against the inside wall of the air mixing chamber. In another aspect, the air mixing performance can be further improved by setting the guide length a2 of this guide wall to 0.05 times or more and 0.5 times or less than the size L2 of a portion of the hitting air stream guide wall which is parallel to the direction of flow of the non-hitting air stream.

When the hitting air stream is flowing at a high velocity, the air temperature varies largely as described later. However, the temperature variation can be decreased by dividing the air inlet 104 guiding the hitting air stream so that the hitting air stream will flow at a specific velocity or at a lower velocity.

Furthermore, in another aspect of this invention, the temperature variation can be further decreased by a means for reducing the velocity of air stream positioned in at least one of the air inlets.

In another aspect, the angle of intersection θ between the first air stream and the first air inlet opening is set at 80 degrees or more and 170 degrees or less. By thus setting the angle of intersection θ, it is possible to improve the air mixing performance.

In another aspect, the angle of intersection γ between the direction of the main stream of air flowing out at the air outlet opening and the direction of the main stream of the first or second air stream is set at −40 degrees or more and 40 degrees or less.

It is therefore possible to improve the air mixing performance by thus setting the angle of intersection γ.

It is desirable to construct the air-conditioning system so that when the temperature of the first air stream is lower than the second air stream, and the air is blown downward in the vehicle interior, the angle of intersection between the direction of the main stream of outflow air and the direction of the main stream of the second air stream will be smaller than the angle of intersection between the main stream of the outflow air and the main stream of the first air stream.

Furthermore, it is desirable to construct the air-conditioning system so that when the temperature of the first air stream is lower than that of the second air stream and when the air is blown out upward in the vehicle interior, the angle of intersection between the direction of the main stream of the outflow air and the direction of the main stream of the first air stream will be smaller than the angle of intersection between the direction of the main stream of the outflow air and the direction of the main stream of the second air stream.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 3A is a perspective view of the air mixing chamber pertaining to the first embodiment of the invention;

FIG. 3B is a schematic view of the air-conditioning chamber pertaining to the first embodiment of the invention as viewed from the air outlet;

FIG. 6A is a perspective view of the air mixing chamber pertaining to the second embodiment of the invention;

FIG. 6B is a schematic view of the air mixing chamber pertaining to the second embodiment of the invention as viewed from the air outlet;

FIG. 8A is a perspective view of the air mixing chamber pertaining to the third embodiment of the invention;

FIG. 8B is a schematic view of the air mixing chamber pertaining to the third embodiment of the invention as viewed from the air outlet;

DESCRIPTION OF THE PREFERRED EMBODIMENTS (First Embodiment)

Figure 1:
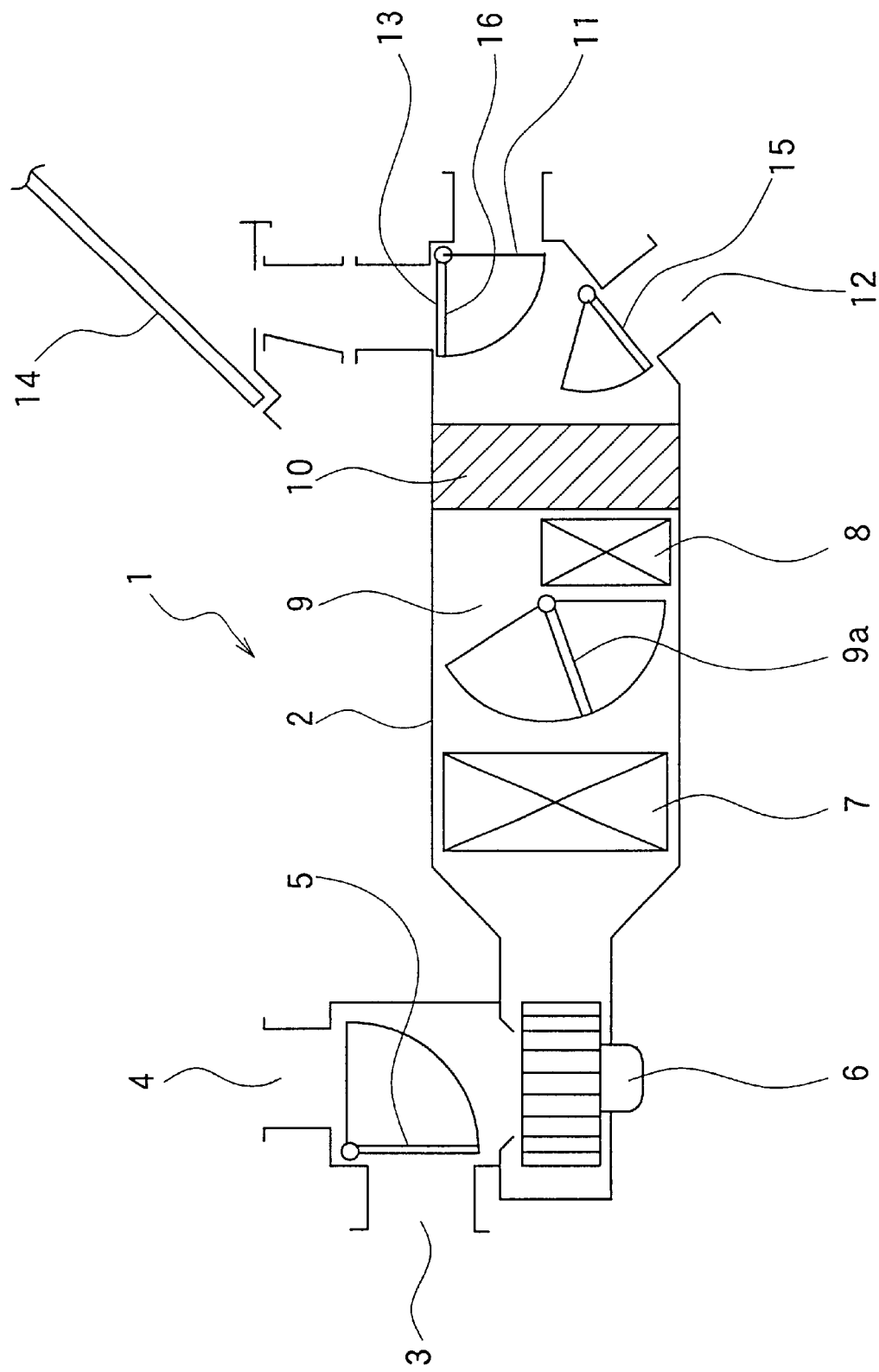
FIG. 1 is a schematic view of an air-conditioning system pertaining to a first embodiment of the invention.

The present embodiment of the invention has been applied to a vehicle-mounted air-conditioning system. FIG. 1 is a schematic view of the vehicle-mounted air-conditioning system (hereinafter referred to as the air-conditioning system).

Numeral 2 refers to an air-conditioner casing (an air-conditioner duct) in which the air to be supplied into the vehicle interior flows. In a part on the air upstream side of the air-conditioner casing are formed an inside air inlet 3 at which the air from the vehicle interior is drawn in, an outside air inlet 4 at which the outside air is drawn in, and an air inlet changeover door 5 which selectively opens and closes the air inlets 3 and 4. The inlet changeover door 5 is opened and closed manually or by a driving means such as a servo motor.

At the downstream side of the inlet changeover door 5 is provided a centrifugal blower 6, by which the air drawn in through the air inlets 3 and 4 is sent toward later-described air outlets 11, 12 and 13. At the air downstream side of the blower 6 is disposed an evaporator 7 which serves as an air cooling means. The air from the blower 6 passes all through the evaporator 7.

Furthermore, at the air downstream side of the evaporator 7 is disposed a heater core 8 which serves as an air heating means. The heater core 8 heats the air by utilizing the cooling water from a vehicle engine (not shown) as a heat source.

In the air-conditioner casing 2 is formed a bypass passage 9 around the heater core 8. At the air upstream side of the heater core 8 is disposed an air mixing door 9a which controls the air volume ratio between the air volume passing through the heater core 8 and the air volume passing through the bypass passage 9. The air that has passed for heating through the heater core 8 will be called the heated air, and the air that has passed through the bypass passage 9 will be called the cooled air.

At the downstream side of the heater core 8 and the bypass passage 9 is provided an air mixing chamber 10, in which are formed a plurality of air strata (heated air strata) where the heated air flows, and a plurality of air strata (cooled air strata) where the cooled air flows. The air mixing chamber 10 will be later described in detail.

At the extreme downstream side of the air-conditioner casing 2 are formed a face air outlet 11 for supplying the conditioned air to the upper body of vehicle occupants, a foot air outlet 12 for supplying the air to the foot area of the vehicle occupants, and a defroster air outlet 13 for supplying the air to the inside surface of a windshield glass 14.

At the upstream side of the air outlets 11, 12 and 13 are provided air blow-out mode changeover doors 15 and 16. The air blow-out mode changeover doors 15 and 16 are opened and closed manually or by a driving means such as a servo motor.

Next, the air mixing chamber 10 will be described.

Figure 2:
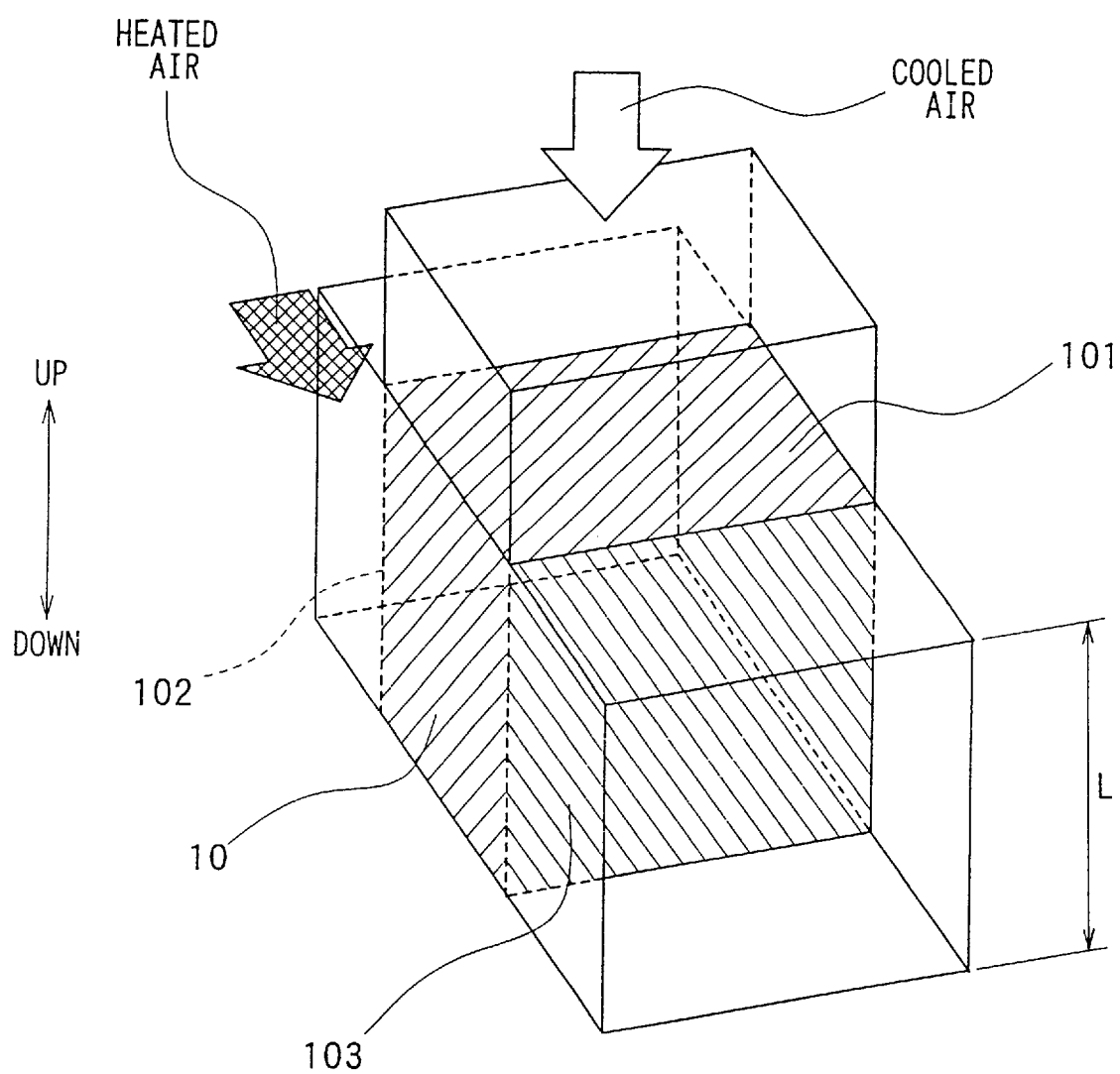
FIG. 2 is a perspective schematic view of an air mixing chamber pertaining to the first embodiment of the invention.

In FIG. 2 the hatched area indicates the air mixing chamber (hereinafter referred to as the mixing chamber) 10. As shown in FIG. 3A, the heated air flows in a horizontal direction into the mixing chamber 10, while the cooled air flows downward from the upper side into the mixing chamber 10.

Therefore, above the mixing chamber 10 are provided the first air inlet opening 101 at which the cooled air (first air stream) is drawn in, and the second air inlet opening 102 which opens in a direction intersecting the first air inlet opening 101 to draw in the heated air (second air stream).

On the opposite side of the second air inlet opening 102 of the approximately regular hexahedron mixing chamber 10 is provided the air outlet opening 103 at which the cooled air and the heated air entering at the inlet openings 101 and 102 flow out.

Therefore, the cooled air that has been drawn into the mixing chamber 10 through the first air inlet opening 101 hits against the inside wall on the lower side of the mixing chamber 10, then diverting the direction of its flow about 90 degrees to flow from the air outlet opening 103 toward each of the blow-out ports 11, 12 and 13. On the other hand, the heated air flows straightforward to each of the air outlets 11, 12 and 13 without hitting against the inside wall of the mixing chamber 10 and without a change of its flow direction.

In the present specification, "the air (cooled air or heated air) hits against the inside wall of the mixing chamber 10" and "the air (cooled air or heated air) does not hit against the inside wall of the mixing chamber 10" are not used in a strict sense but are used in a macroscopic view of the air streams.

At the inlet openings 101 and 102 are formed the guide walls 104 and 105, which divide the inlet openings 101 and 102 into a plurality of ports, extending from the inlet openings 101 and 102 into the mixing chamber in parallel with the air stream. The guide walls 104 and 105 are so formed as to alternately produce a stratum of cooled air (hereinafter referred to as the cooled air stratum) and a stratum of heated air (hereinafter referred to as the heated air stratum) as viewed from the air outlet opening 103 side as shown in FIG. 3B.

The guide wall 104 which guides the cooled air to form the cooled air stratum is called the first guide wall 104, and the guide wall 105 which guides the heated air to form the heated air stratum is called the second guide wall 105, and a space 107 in the mixing chamber 10 in which the first and second guide walls 104 and 105 are not present is called a mixing space 107. The first and second guide walls 104 and 105 make up a multi-stratum structure section, thereby enabling a hitting of strata of air streams.

The first and second guide walls 104 and 105 are provided with a tapered portion 106 on the upstream side of the air stream which decreases in the sectional area as it goes toward the upstream side of the air stream for the purpose of smooth introduction of air in each air stratum.

Next, features of the present embodiment will be described. The formation of the first and second guide walls 104 and 105 for alternate formation of the cooled air stratum and the heated air stratum as viewed from the air outlet opening 103 side is aimed at increasing the contact surface area of the cooled air and the heated air to thereby improve the air-mixing performance for mixing the cooled air and the heated air. To reliably improve the air-mixing performance, it is necessary to lead the cooled air and the heated air into the mixing space 107 with the cooled air stratum and the heated air stratum properly formed.

If, in this case, the guide lengths a1 and a2 of the first and second guide walls 104 and 105 are short, the cooled air and the heated air go into the mixing space 107 without formation of the cooled air stratum and the heated air stratum, resulting in a failure in improving the air-mixing performance. Contrarily, if the guide lengths a1 and a2 of the first and second guide walls 104 and 105 are excessively long, the volume of the mixing space 107 (particularly the length of a portion parallel to the direction of air flow) will decrease, failing in sufficiently mixing the cooled air and the heated air.

The guide lengths a1 and a2 of the first and second guide walls 104 and 105 are the lengths of such portions of the guide walls 104 and 105 that are parallel to the direction of air flow to be guided.

Figure 4:
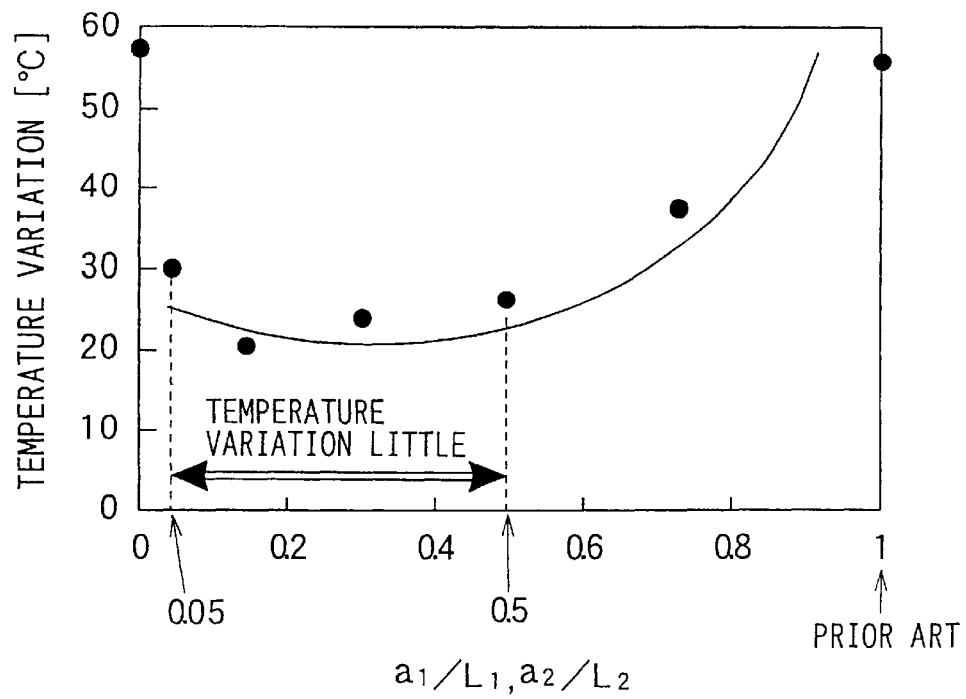
FIG. 4 is a graph showing a relation between temperature variation and size ratio in the case the air mixing chamber pertaining to the first embodiment of the invention.

The direction of flow of the cooled air is changed about 90 degrees. after hitting the inside wall of the mixing chamber 10. The inventor et al, therefore, have studied by using a numerical simulation a relation between the first guide length a1 and the length L1 (shown in FIG. 3A) to the inside wall of the mixing chamber 10 against which the cooled air (hitting air stream) from the first air inlet opening 101 hits against, reaching the conclusion that it is desirable to set the first guide length a1 at 0.05 times or more to 0.5 times or less than the length L1 as shown in FIG. 4.

It is desirable to set the guide length a2 of the second guide wall 105 which guides the heated air (non-hitting air stream) flowing to the air outlet opening 103 without hitting against the inside wall of the air mixing chamber 10 from 0.05 times or more to 0.5 times or less than the length L2 (shown in FIG. 3A) of a portion parallel to the direction of flow of the heated air of the first guide wall 104.

Figure 5:
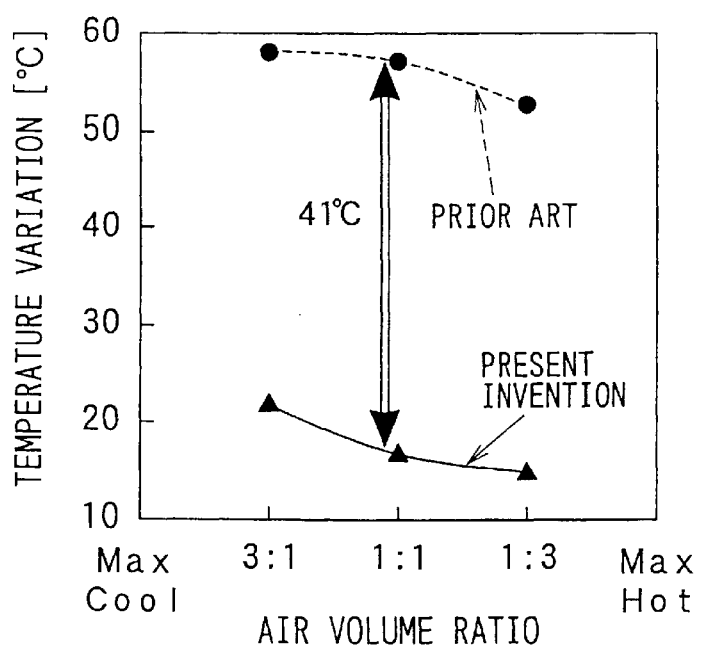
FIG. 5 is a graph showing a relation between temperature variation and air volume ratio in the case the air mixing chamber pertaining to the first embodiment of the invention.

Therefore, with the first guide length a1 set from 0.05 time or more to 0.5 times or less than the length L1, and the guide length a2 from 0.05 time or more to 0.5 times or less than the length L2, it is possible to mix the cooled air and the heated air sufficiently to reduce a temperature variation as shown in FIG. 5.

In the present embodiment, the first guide length a1 is set from 0.05 time or more to 0.5 times or less than the length L1 and the guide length a2 is set from 0.05 time or more to 0.5 times or less than the length L2. There, however, will occur no problem in practical use if at least the first guide length a1 is set from 0.05 time or more to 0.5 times or less than the length L1.

(Second Embodiment)

The cooled air that has struck the inside wall of the mixing chamber 10 changes its direction of flow to push the heated air upward with an increase in the volume of the cooled air. Therefore, if the cooled air velocity increases, proper mixing of the cooled air and the heated air will fail. In the present embodiment, therefore, the cooled air is passed to the heated air stratum located at about the center of the first air inlet opening 101 of a plurality of heated air strata, to decrease the volume of air per the cooled air stratum, thereby reducing the velocity of the cooled air in the plurality of cooled air strata lower than the specific flow velocity.

Figure 7:
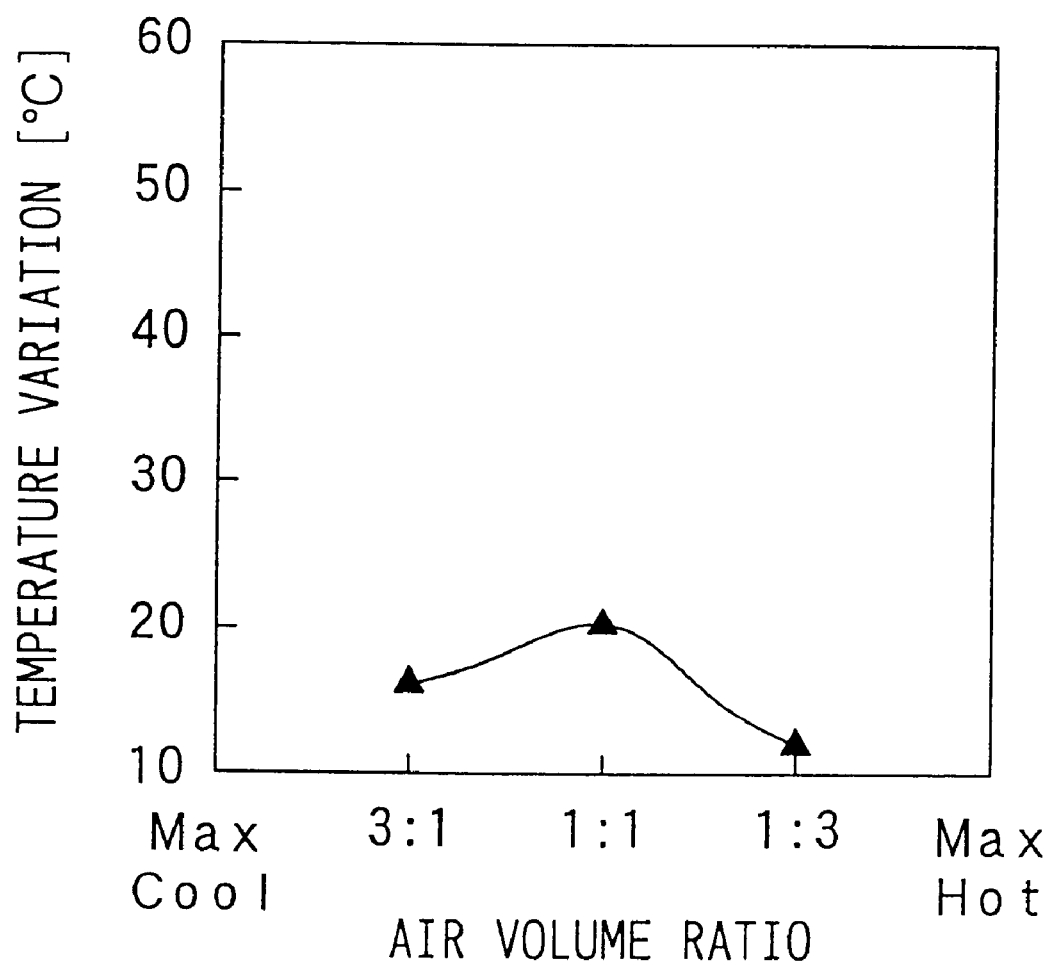
FIG. 7 is a graph showing a relation between temperature variation and air volume ratio in the case the air mixing chamber pertaining to the second embodiment of the invention.

Thus it becomes possible to restrain the cooled air, that has hit on the inside wall of the mixing chamber 10, from pushing up the heated air. Therefore, as shown in FIG. 7, a temperature variation can be diminished by sufficiently mixing the cooled air and the heated air. In the present embodiment, the cooled air is passed to a part of the heated air stratum to thereby lower the flow velocity of the cooled air stratum. However, the total sectional area of passages of the cooled air strata may be increased by increasing the width W of the cooled air strata or the number of the cooled air strata.

Furthermore, in the present embodiment, the cooled air flows in a heated air stratum of the plurality of heated air strata located at about the central part of the first air inlet opening 101. This is because the largest distribution of the air velocity is noticed at about the central part of the first air inlet opening 101. It should be noted that the heated air stratum where the cooled air flows is not limited to about the central part of the first air inlet opening 101.

(Third Embodiment)

According to the present embodiment, the cooled air flows in the heated air stratum and, as shown in FIG. 8, a cap 108 (an air velocity reducing means) is provided to decrease the velocity of the cooled air (to prevent the inflow of much cooled air into the heated air stratum). It is therefore possible to restrain the cooled air from pushing up the heated air after striking the inside wall of the mixing chamber 10. Therefore, as indicated by the solid line in FIG. 9, the temperature variation can be decreased by fully mixing the cooled and the heated air.

Furthermore, in the present embodiment, the cap 108 is fixedly attached on the first guide wall 104. Since, however, the position of the largest air velocity distribution varies depending on the amount of opening of the air mixing door 9a and on the condition of the blow-out mode changeover doors 15 and 16, the position of the cap 108 may be variably controlled in interlock with the amount of opening of the air mixing door 9a and the operation of the blow-out mode changeover doors 15 and 16.

Figure 9:
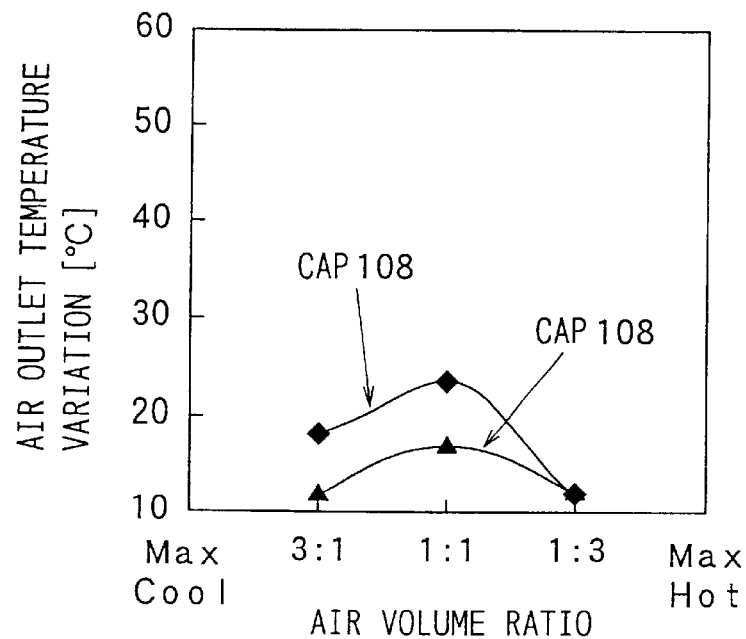
FIG. 9 is a graph showing a relation between temperature variation and air volume ratio in the case the air mixing chamber pertaining to the third embodiment of the invention.

In FIG. 9, the broken line indicates a temperature variation when the position of the cap 108 is variably controlled in interlock with the amount of opening of the air mixing door 9a. The graphs of the temperature variation shown in FIGS. 6, 7 and 9 show a result of tests conducted at a point 50 mm apart from the mixing chamber 10.

(Fourth Embodiment)

Figure 10:
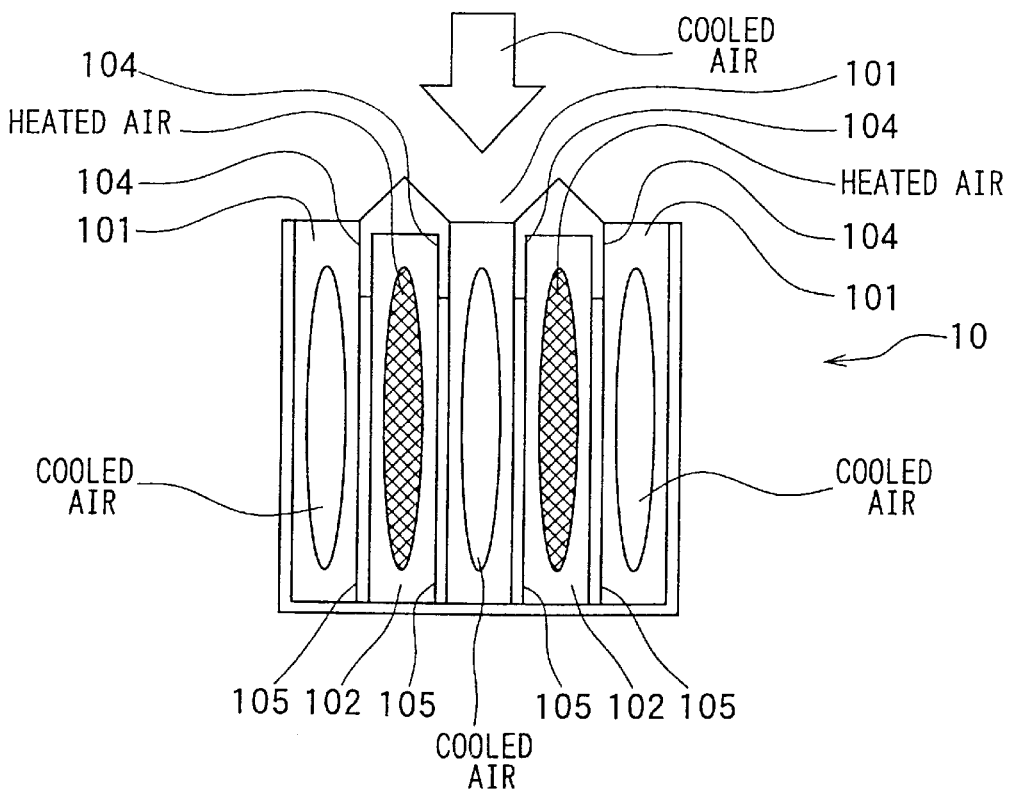
FIG. 10 is a schematic view of the air mixing chamber pertaining to the fourth embodiment of the invention as viewed from the air outlet.

In the present embodiment, as shown in FIG. 10, the arrangement of the cooled air strata and the heated air strata is reversed in relation to that in the first to third embodiments.

(Fifth Embodiment)

Figure 11A:
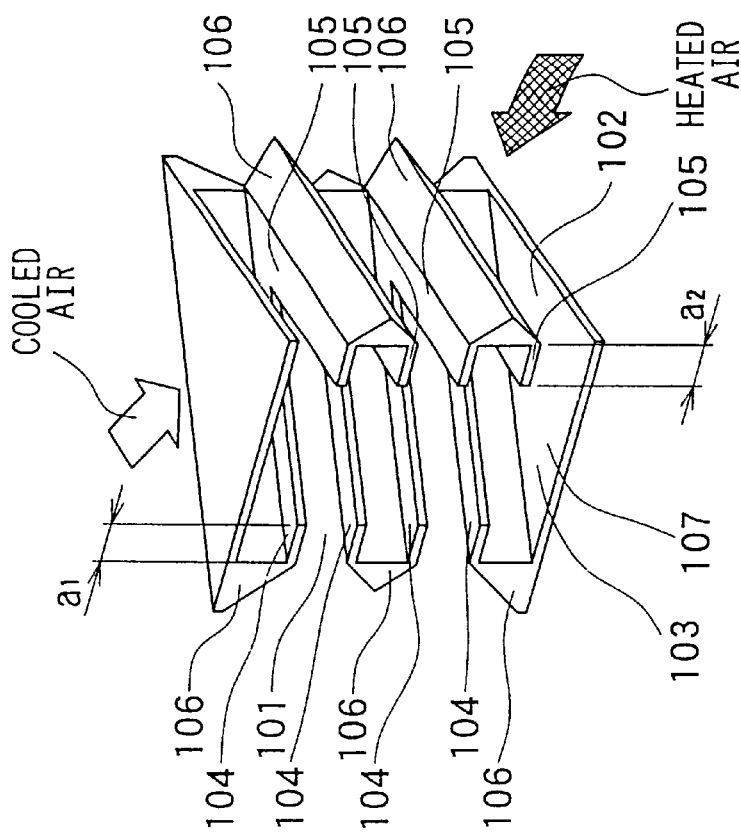
FIG. 11A is a schematic view of the air mixing chamber pertaining to the fifth embodiment of the invention.
Figure 11B:
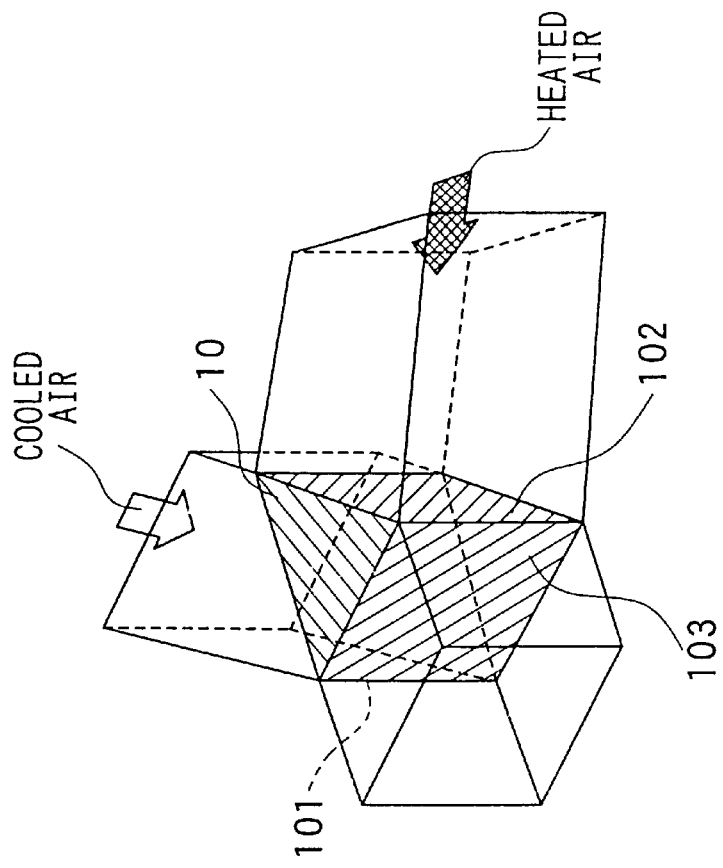
FIG. 11B is a schematic view of the air mixing chamber pertaining to the fifth embodiment of the invention.

In the embodiments stated above, the cooled air after hitting against the inside wall on the lower side of the mixing chamber 10, changes the direction of its flow about 90 degrees to flow to the air outlets 11 to 13 from the air outlet opening 103. On the other hand, the heated air flows straight toward the air outlets 11 to 13 side without a collision to the inside wall of the mixing chamber 10. In the present embodiment, however, as shown in FIG. 11, both the cooled air and the heated air hit against the inside wall of the mixing chamber, changing their flow directions.

In the present embodiment, the length L from the inlet openings 101 and 102 to the inside wall on which the air stream strikes differs with the position where the air flows in. The guide lengths a1 and a2, therefore, are determined on the basis of a mean value of the length L. The guide lengths a1 and a2 may be altered according to a change in the length L (a position where the air flows in).

(Sixth Embodiment)

In the above-described embodiment, the hitting angle θ of the cooled air and the heated air was determined arbitrarily. In the present embodiment, however, the hitting angle θ of the cooled air and the heated air is set at 80 degrees or more and 170 degrees or less.

Figure 12A:
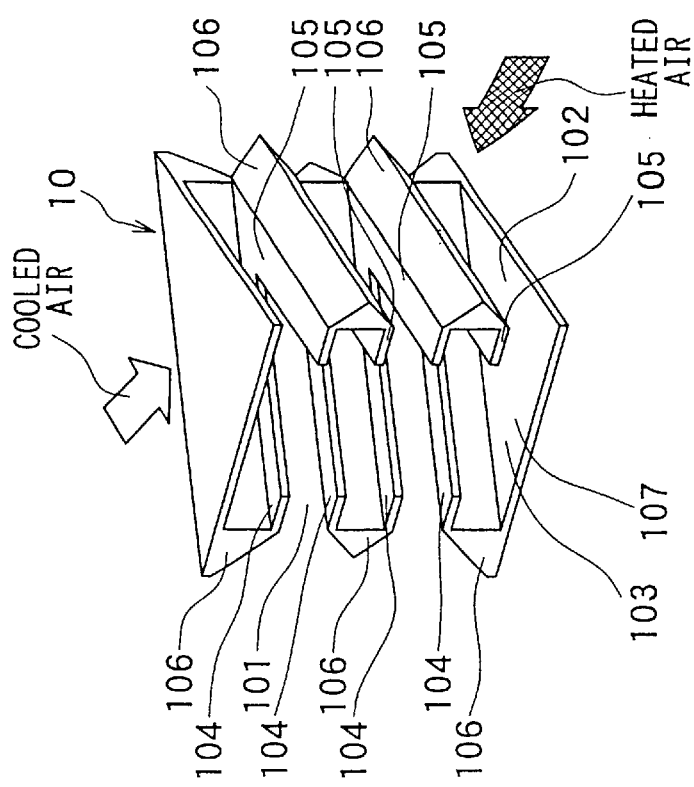
FIG. 12A is a schematic view of the air mixing chamber pertaining to the sixth embodiment of the invention.
Figure 12B:
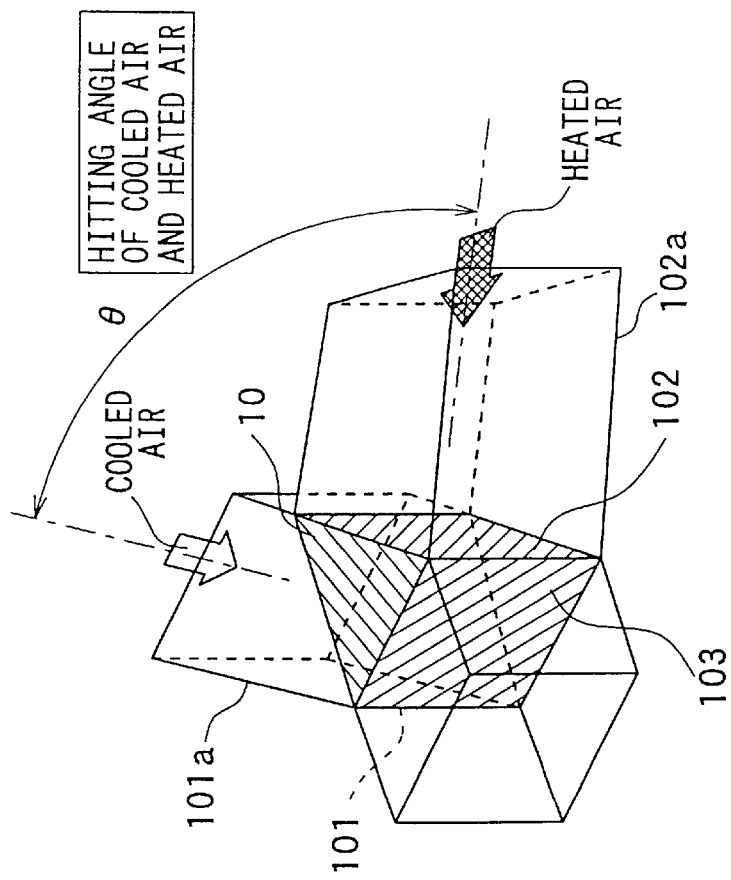
FIG. 12B is a schematic view of the air mixing chamber pertaining to the fifth embodiment of the invention.
Figure 13A:
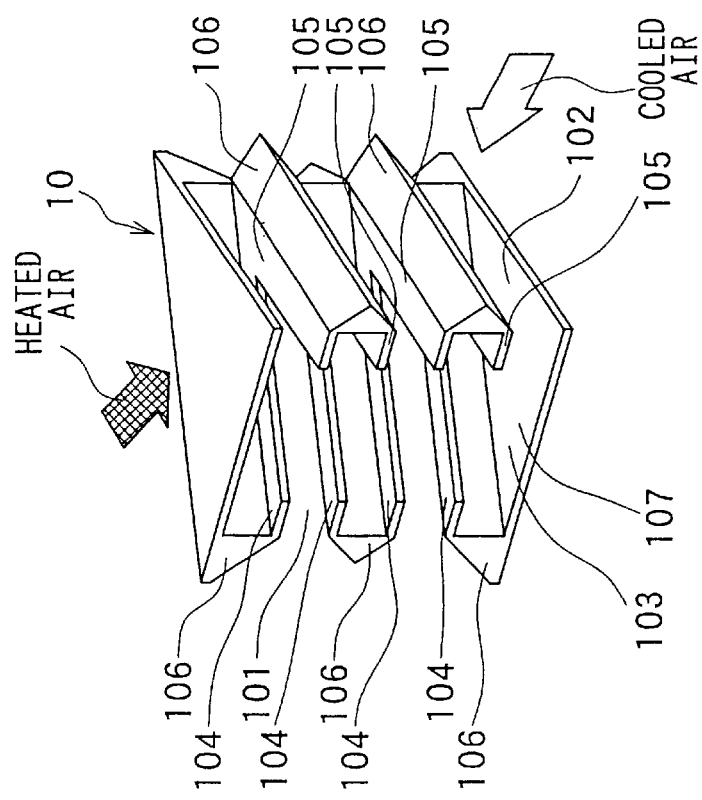
FIG. 13A is a schematic view of the air mixing chamber pertaining to the sixth embodiment of the invention.
Figure 13B:
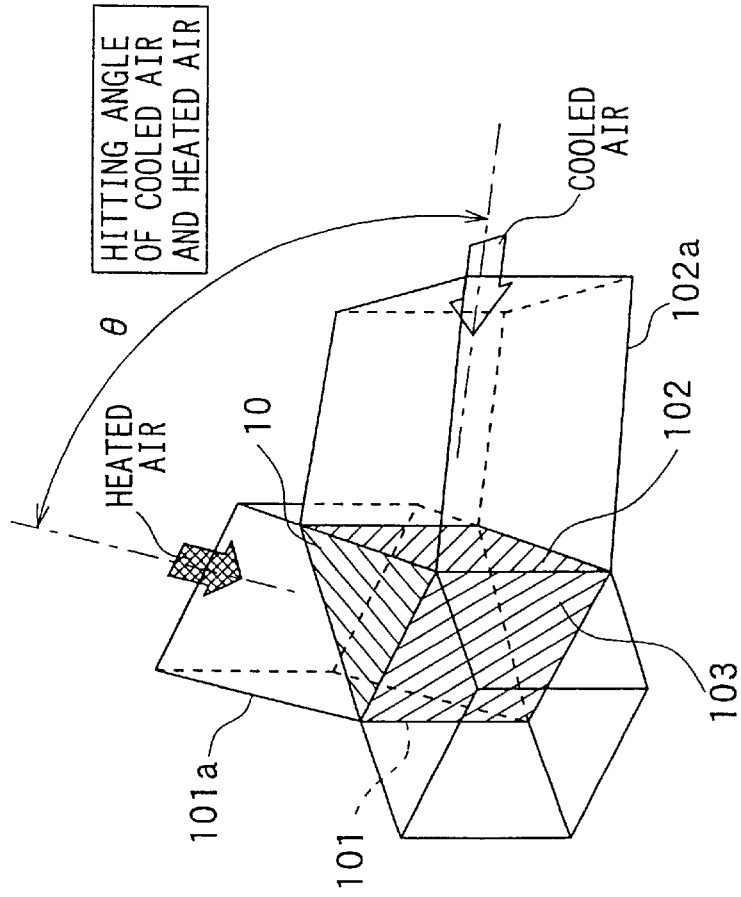
FIG. 13B is a schematic view of the air mixing chamber pertaining to the fifth embodiment of the invention.

The hitting angle θ stated here, as shown in FIGS. 12 and 13, is formed by the direction of the main cooled stream (the direction of the arrow indicated in white) entering the air mixing chamber 10 and the direction of the main heated air stream (direction of the arrow indicated by hatch lines. Concretely, the hitting angle θ is the angle formed by the axial direction of the first duct portion 101a connected to the first air inlet opening 101 and the axial direction of the second duct portion 102a connected to the second inlet.

Figure 14:
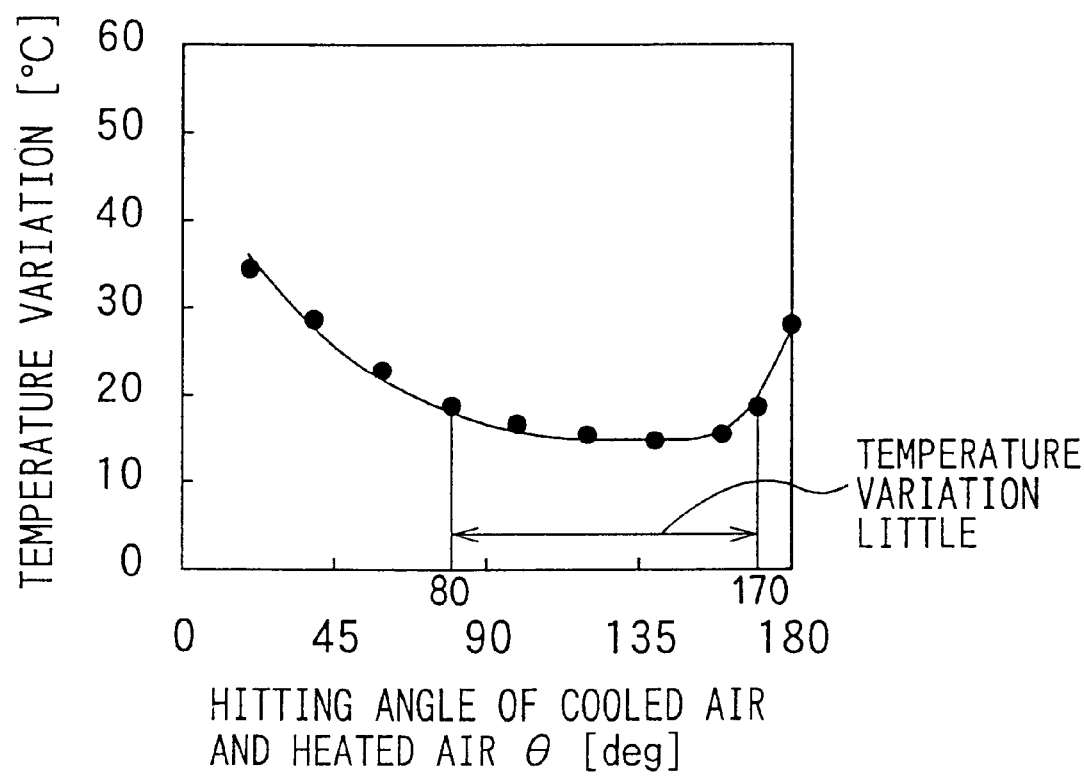
FIG. 14 is a graph showing a relation between the hitting angle $\theta$ and after-hitting air temperature variation where the air mixing chamber pertaining to the sixth embodiment of the invention is used.

FIG. 14 shows a result of numerical simulation showing a relation between the hitting angle θ and the temperature variation of the after-hitting air. As is clear from FIG. 14, the temperature variation of the after-hitting air can be decreased by setting the hitting angle θ at 80 degrees or more and 170 degrees or less.

Figure 15A:
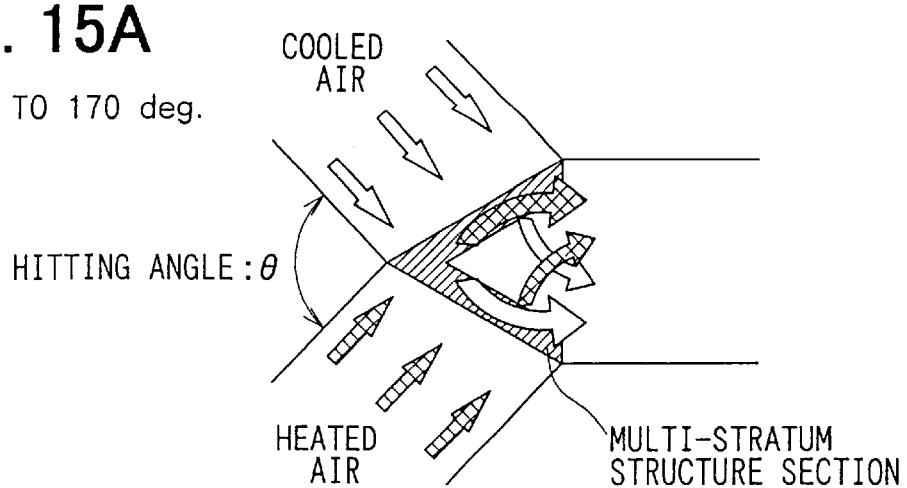
FIG. 15 is a schematic view showing the air flow in the air mixing chamber.
Figure 15B:
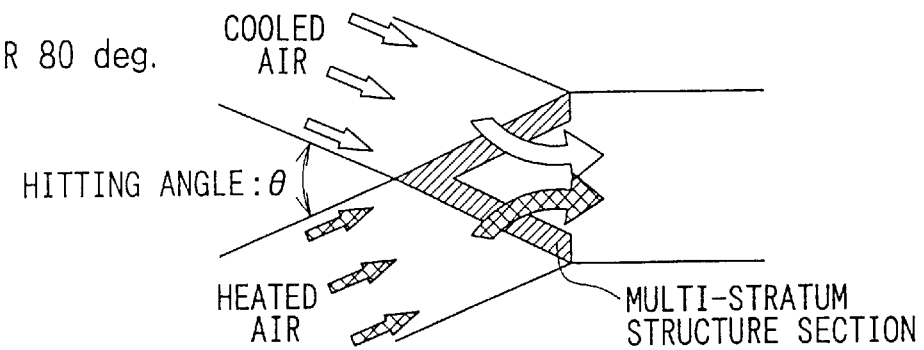
Figure 15C:
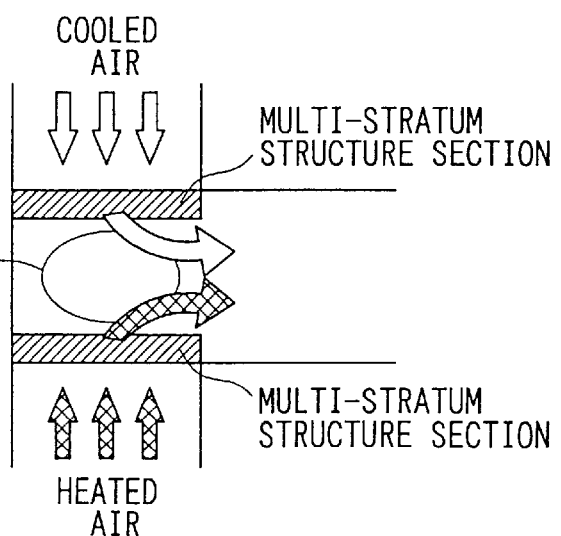

FIG. 15 is a schematic view showing the hitting state of the cooled air and the heated air. When the hitting angle θ is 80 degrees or more and 170 degrees or less (shown in FIG. 15A), the cooled air and the heated air are properly mixed by proper hitting. When the hitting angle θ is less than 80 degrees (shown in FIG. 15B), the cooled air and the heated air will not sufficiently mix, flowing out of the air mixing chamber 10. Also when the hitting angle θ is greater than 170 degrees (shown in FIG. 15C), the cooled air and the heated air hit in a jet, and therefore it becomes difficult to fully mix the cooled air and the heated air.

(Seventh Embodiment)

In the present embodiment, the angle of intersection (hereinafter referred to as the blow-out angle γ) between the direction of the main stream of the after-hitting air and the direction of the main stream of the cooled air or the heated air flowing into the air mixing chamber 10 is set at −40 degree or more and 40 degrees or less. The angle of intersection adopted is an absolute value of a small angle.

Figure 16A:
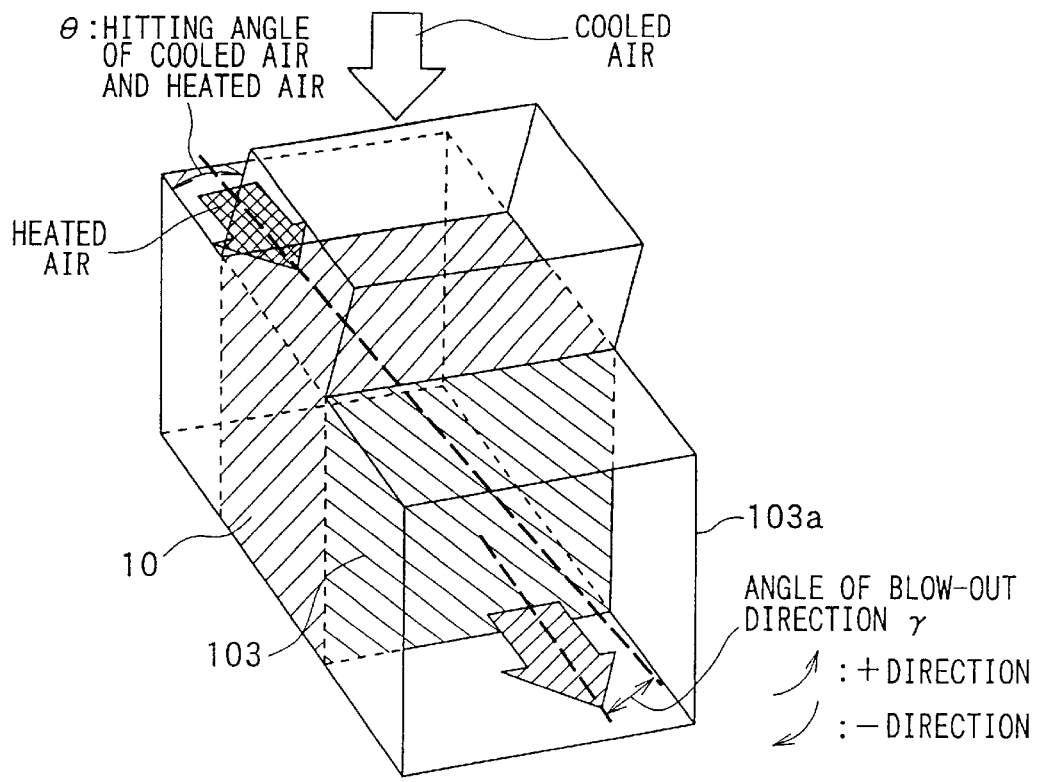
FIG. 16A is a schematic view of the air mixing chamber pertaining to the seventh embodiment of the invention.
Figure 16B:
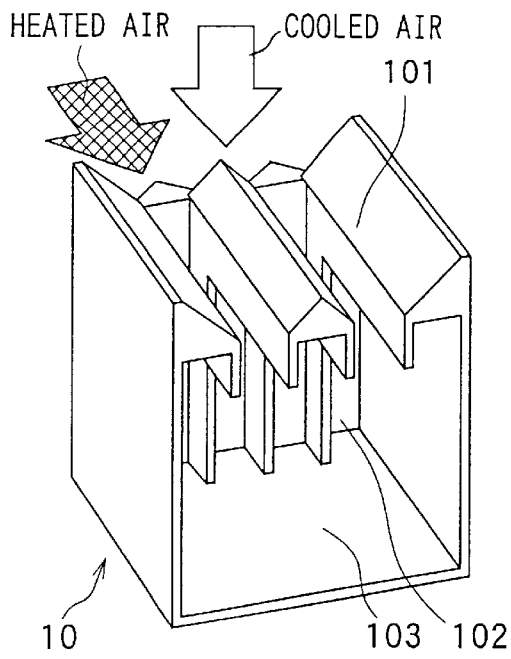
FIG. 16B is a perspective view of the air mixing chamber pertaining to the seventh embodiment of the invention.
Figure 16C:
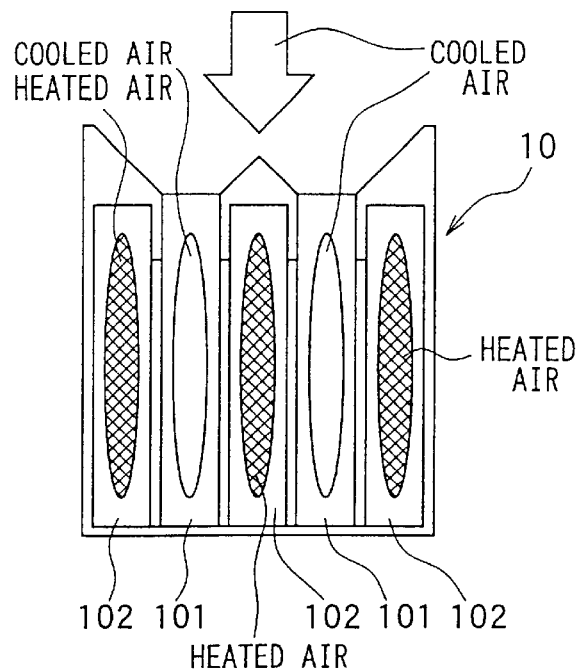
FIG. 16C is a schematic view of the air mixing chamber pertaining to the seventh embodiment of the invention as viewed from the air outlet.
Figure 17A:
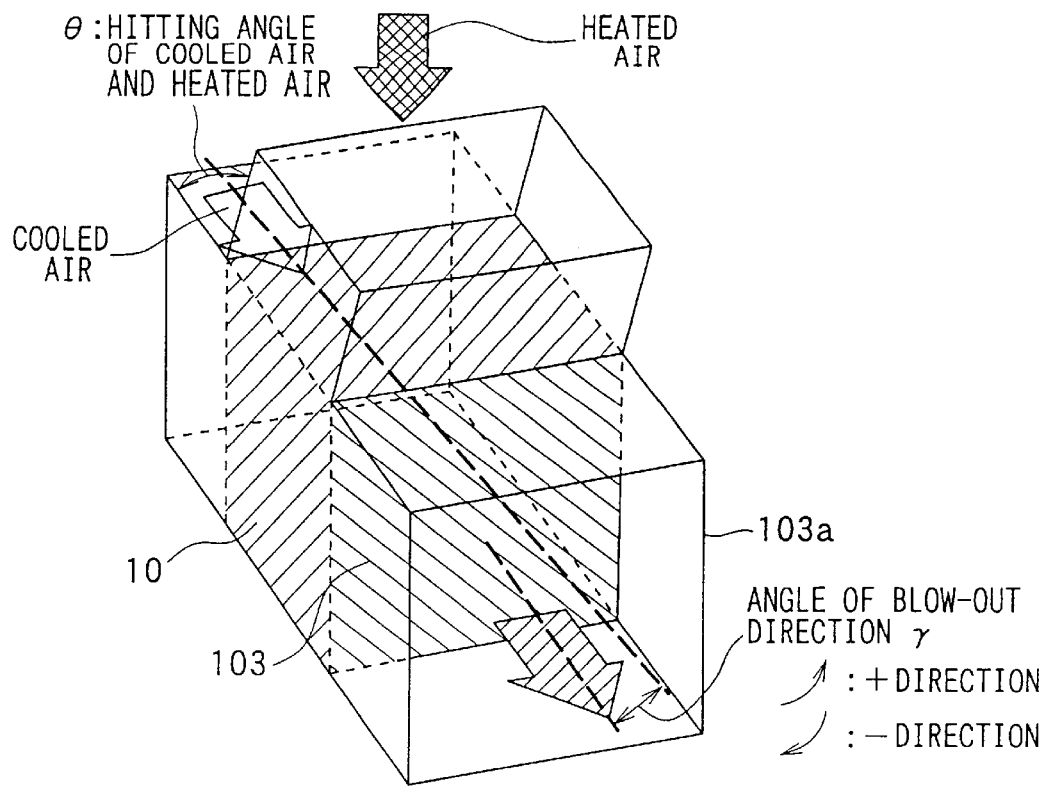
FIG. 17A is a schematic view of the air mixing chamber pertaining to the seventh embodiment of the invention.
Figure 17B:
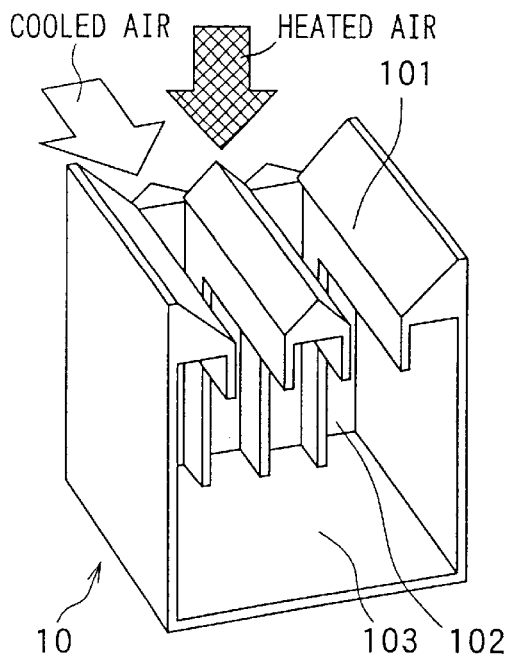
FIG. 17B is a perspective view of the air mixing chamber pertaining to the seventh embodiment of the invention.
Figure 17C:
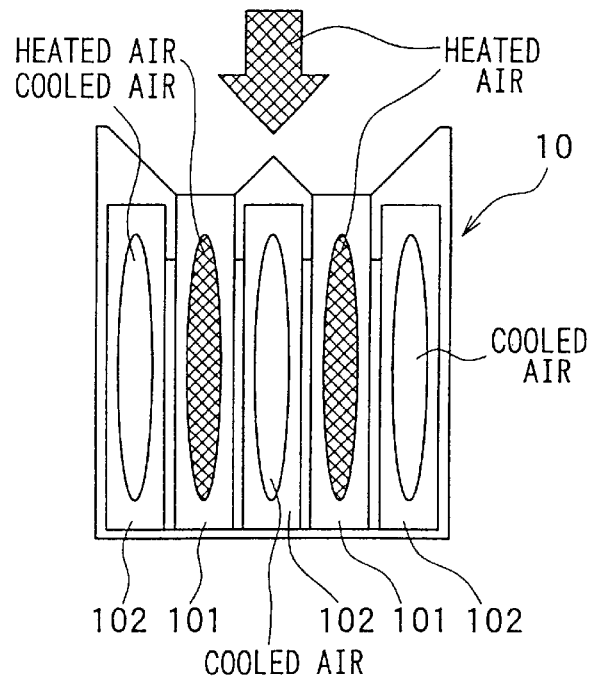
FIG. 17C is a schematic view of the air mixing chamber pertaining to the seventh embodiment of the invention as viewed from the air outlet.

The direction of the main stream of the after-hitting air is, as shown in FIGS. 16 and 17, is the axial direction of the duct portion 103 connected to the air outlet opening 103.

When the angle of intersection relative to the cooled air flowing into the air mixing chamber 10 is specified as the blow-out angle γ, the direction of the main stream of the heated air is positive (+) and the direction of the main stream on the opposite side is negative (−) relative to the direction of the main stream of the cooled air set at the reference point (0°). On the other hand, when the blow-out angle γ is specified by the angle of intersection relative to the heated air flowing into the air mixing chamber 10, the direction of the main stream of the cooled air is positive (+) and the opposite side is negative (−) relative to the direction of the main stream of the heated air set at the reference point (0°).

Figure 18:
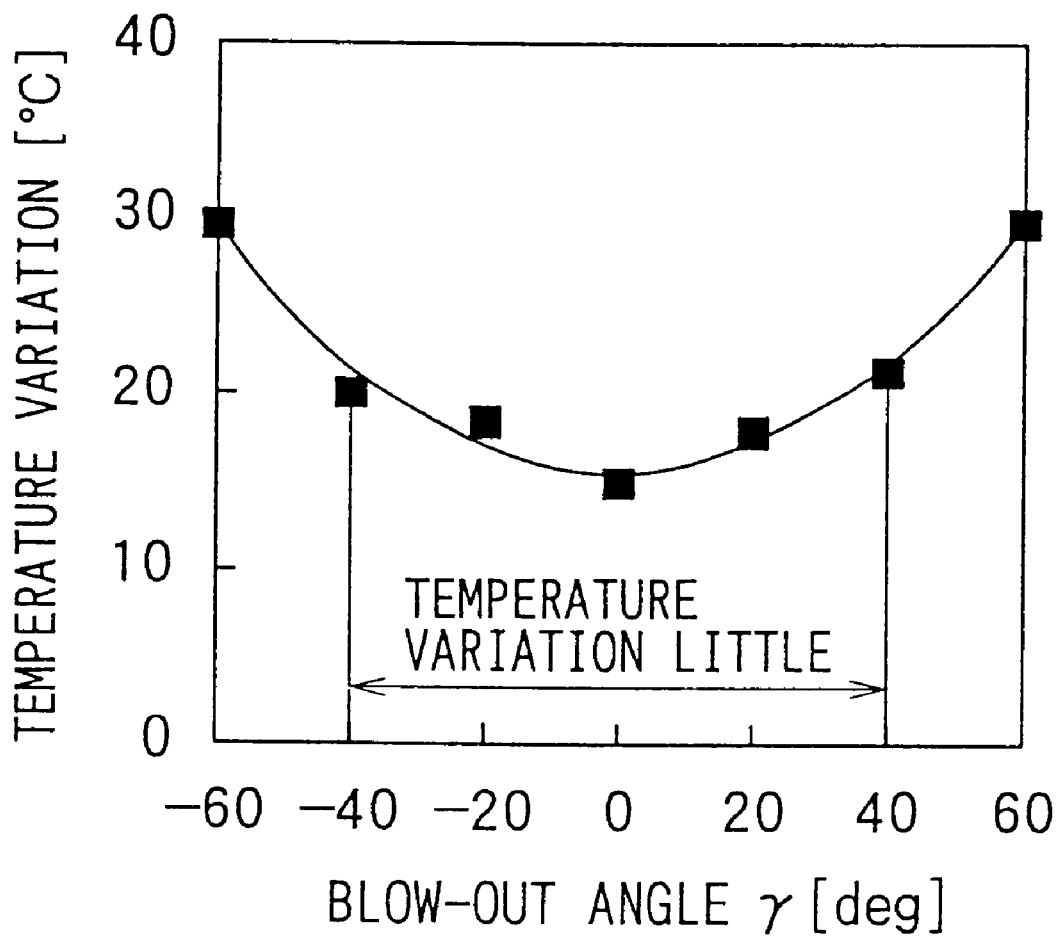
FIG. 18 is a graph showing a relation between the blow-out angle $\gamma$ and the temperature variation of after-hitting air in the air mixing chamber pertaining to the seventh embodiment of the invention.

FIG. 18 is a result of numerical simulation showing a relation between the blow-out angle γ and a temperature variation of the after-hitting air. As is clear from FIG. 18, when the blow-out angle γ is −40 degrees or more and 40 degrees or less, it is possible to decrease the temperature variation of the after-hitting air.

Figure 19A:
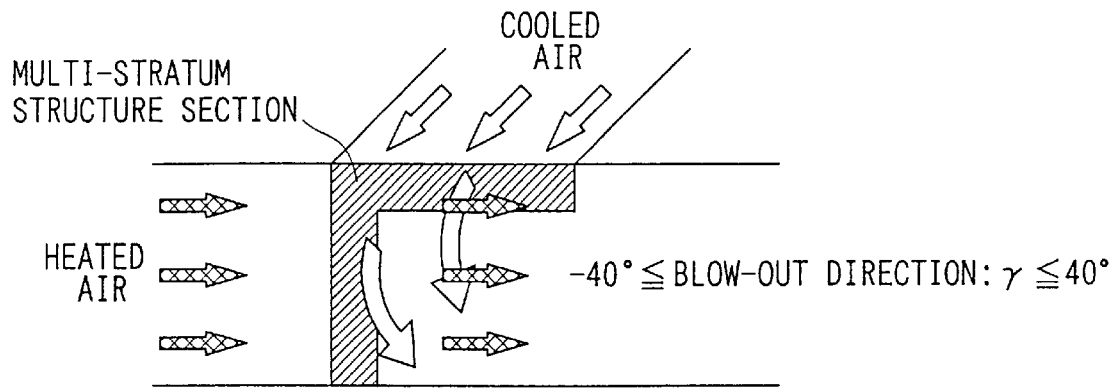
FIG. 19 is a schematic view showing the air stream in the air mixing chamber.
Figure 19B:
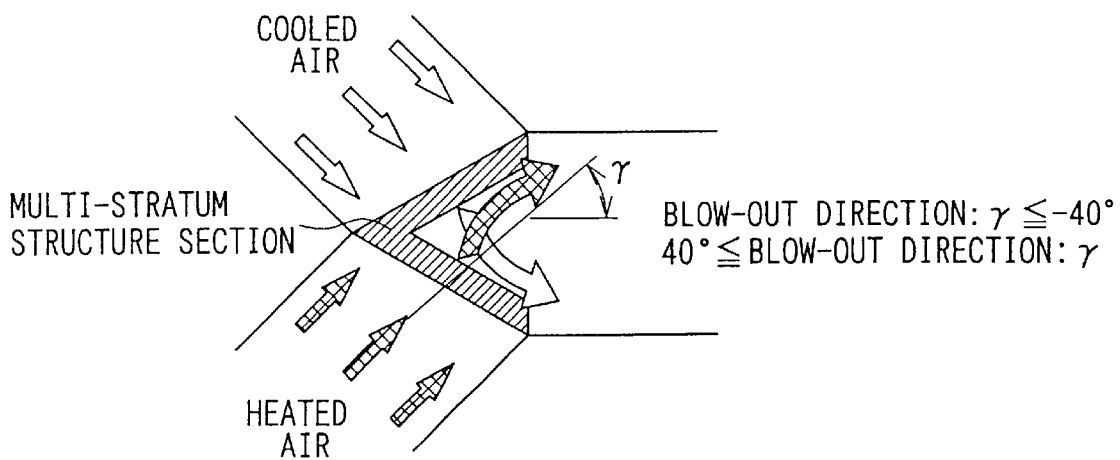

FIG. 19 is a schematic view showing the hitting status of the cooled air and the heated air. When the blow-out angle γ is −40 degrees or more and 40 degrees or less, the cooled air and the heated air properly hit against each other so as to be mixed properly.

Figure 20:
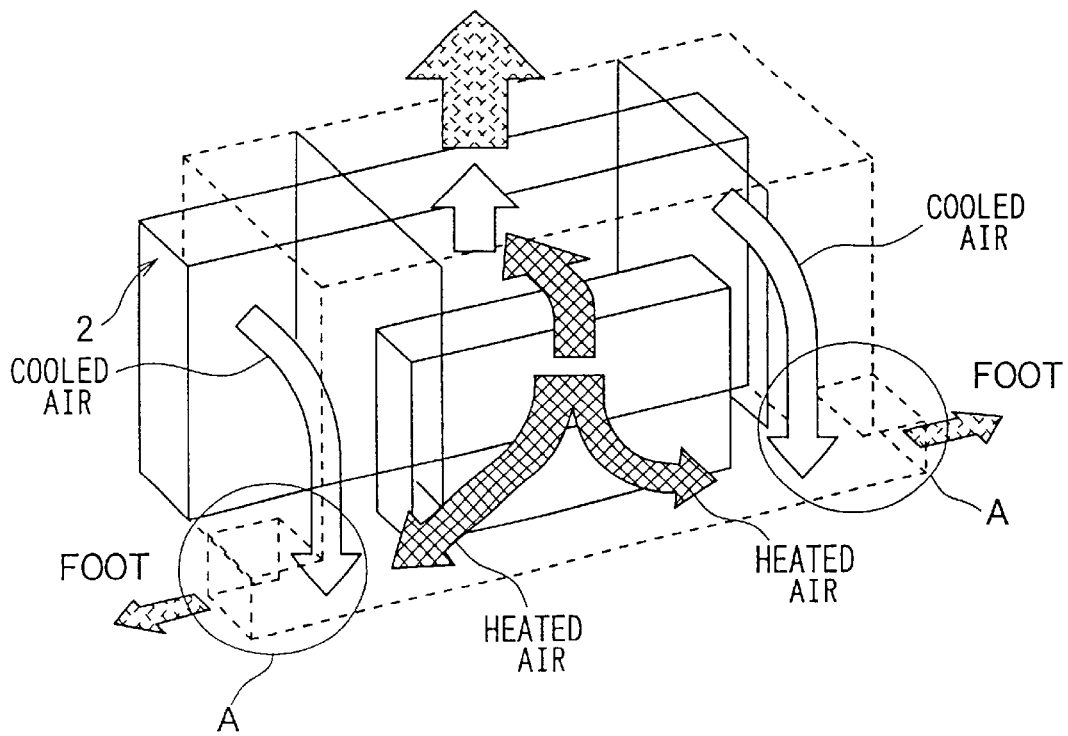
FIG. 20 is a schematic view of the air-conditioner casing using the air mixing chamber pertaining to the seventh embodiment of the invention.
Figure 21:
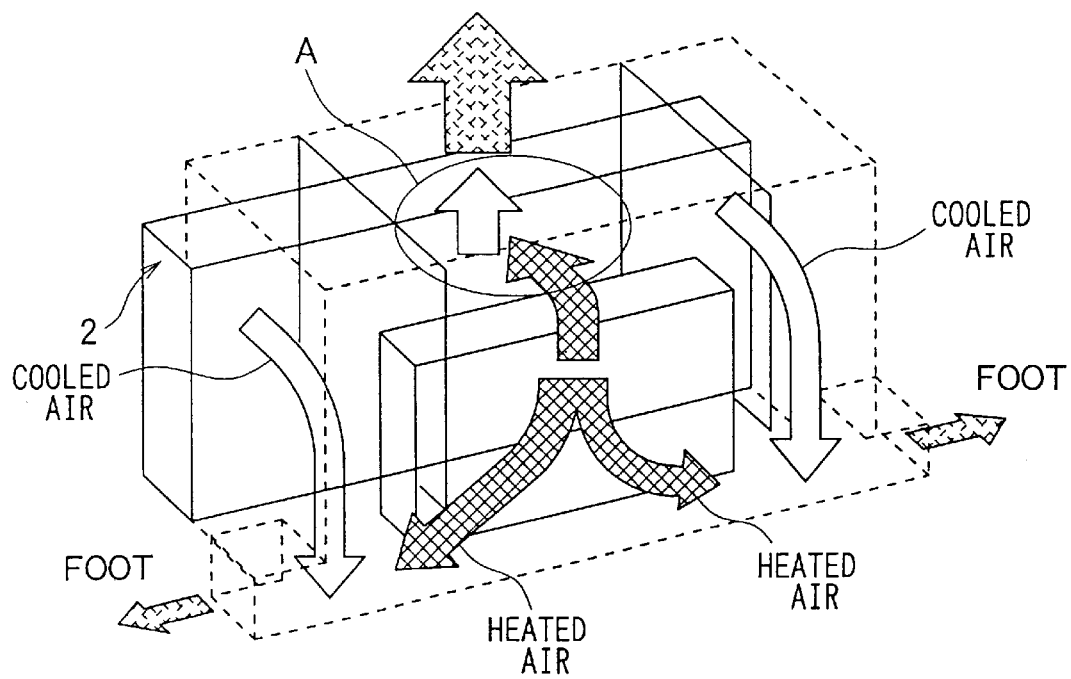
FIG. 21 is a schematic view of the air-conditioner casing using the air mixing chamber pertaining to the seventh embodiment of the invention.

Therefore, the air-conditioner casing 2 (air mixing chamber 10) is configured so that when the relatively hot air is blown out for example at the foot air outlet 12 downward into the vehicle interior, the angle of intersection between the direction of the main stream of the after-hitting air and the direction of the main stream of the heated air will be smaller than the angle of intersection between the direction of the main stream of the after-hitting air and the direction of the main stream of the cooled air as shown in FIG. 20A. On the other hand, it is desirable to build the air-conditioner casing 2 (air mixing chamber 10) so that when the relatively cold air is blown out upward into the vehicle interior through the face air outlet 11 and the defroster air outlet 13, the angle of intersection between the direction of the main stream of the after-hitting air and the direction of the main stream of the cooled air will be smaller than the angle of intersection between the direction of the main stream of the after-hitting air and the direction of the main stream of the heated air.

To describe more specifically, it is desirable to configure the air-conditioner casing 2 so as to allow the heated air to flow nearly straight in a part where, like the foot air outlet 12, the relatively hot air is blown out to the lower area of the vehicle interior, and also to allow the cooled air to flow nearly straight in a part where, like the face air outlet 11 and the defroster air outlet 13, the relatively cold air is blown out to the upper area of the vehicle interior.

(Other Embodiments)

In the first to fourth embodiments, the cooled air that has hit the lower inside wall of the mixing chamber 10, changing the direction of flow about 90 degrees to flow out at the air outlet opening 103 toward the air outlets 11, 12 and 13, while the heated air flows straight toward the air outlets 11, 12 and 13 without a collision against the inside wall of the mixing chamber 10. It is to be noticed, however, that the present invention is not limited thereto and the cooled air and the heated air may flow in the opposite direction of the first to fourth embodiments.

Furthermore, in the first to fourth embodiments, the first air inlet opening 101 and the second air inlet opening 102 are intersect each other. However, it should be noticed that this invention is not limited thereto.

While the above-described embodiments refer to examples of usage of the present invention, it is understood that the present invention may be applied to other usage, modifications and variations of the same, and is not limited to the disclosure provided herein.

What is claimed is:

1. An air-mixing air-conditioning system controlling a temperature of air blown into a vehicle interior after mixing a first air stream and a second air stream which differ in temperature, the system comprising:

an air mixing chamber having a first air inlet opening at which the first air stream is introduced, a second air inlet opening which opens in a direction intersecting the first air inlet opening for introduction of the second air stream, and an outlet opening at which the first air stream introduced through the first air inlet opening and the second air stream introduced through the second air inlet opening flow out; and guide walls dividing the first and second air inlet openings into a plurality of sections and extending in a direction parallel with the air flow;

wherein the air mixing chamber is configured such that at least one of the first and second air streams hits against an inside wall of the air mixing chamber, flowing toward the outlet opening side after changing the direction of its flow;

wherein, as viewed from the outlet opening, a guidance wall that guides a non-hitting air stream is established along an imaginary line extending from a guidance wall that guides a hitting air stream to the inner wall of the air mixing chamber, so that when the first and the second air streams are led to the guidance walls, respectively, and flow to the air mixing chamber, air stratums of the first and the second air streams are alternately produced therein; and wherein a guide length a1 of a first one of the guide wall that guides a hitting air stream hitting against an inside wall of the air mixing chamber is set from 0.05 times or more to 0.5 times less than a length L1 from one of the inlet openings for introducing the hitting air stream to the inside wall of the air mixing chamber against which the hitting air stream hits.

2. An air-conditioning system as claimed in claim 1, wherein a guide length a2 of the first of the guide walls for guiding the hitting air stream flowing to the air outlet opening without a collision against the inside wall of the air mixing chamber, is set from 0.05 time or more to 0.5 times or less than a length L2 of a part of the guide wall which guides the hitting air stream, which is parallel to the direction of flow of the hitting air stream.

3. An air-conditioning system according to claim 1, wherein the air inlet opening for guiding the hitting air stream is so divided as to decrease the flow velocity of the hitting air to a specific velocity or lower.

4. An air-conditioning system according to claim 1, wherein at least one of the air inlet openings is provided with a reducing means for reducing a velocity of air stream.

5. An air-conditioning system according to claim 1, wherein an angle of intersection θ between the first air stream and the second air stream is set in a range from 80 degrees or more to 170 degrees or less.

6. An air-conditioning system according to claim 1, wherein the angle of intersection γ between a direction of the main stream of air flowing out from the air outlet opening and the direction of a main stream of the first or second air streams is set in a range from −40 degrees or more to 40 degrees or less.

7. An air-conditioning system according to claim 6, wherein a temperature of the first air stream is lower than that of the second air stream; and wherein the angle of intersection between the direction of the main stream of the outgoing air and the direction of the main stream of the second air stream becomes smaller than the angle of intersection between the direction of the main stream of the outgoing air and the direction of the main stream of the first air stream when air is blown out to the lower part of the vehicle interior.

8. An air-conditioning system according to claim 6, wherein a temperature of the first air stream is lower than that of the second air stream; and wherein the angle of intersection between the direction of the main stream of the outgoing air and the direction of the main stream of the first air stream becomes smaller than the angle of intersection between the direction of the main stream of the outgoing air and the direction of the main stream of the second air stream when the air is blown out to the upper part of the vehicle interior.

9. An air-conditioning system according to claim 1, wherein the air mixing chamber is located where air having passed through the outlet is introduced to the foot air outlet.

10. An air-conditioning system according to claim 1, wherein the first and second air streams flow toward the outlet after changing direction of flow by the inner wall of the air mixing chamber.

11. An air-mixing air-conditioning system controlling a temperature of air blown into a vehicle interior after mixing a first air stream and a second air stream which differ in temperature, the system comprising:

an air mixing chamber having a first air inlet opening at which the first air stream is introduced, a second air inlet opening which opens in a direction intersecting the first air inlet opening for introduction of the second air stream, and an outlet opening at which the first air stream introduced through the first air inlet opening and the second air stream introduced through the second air inlet opening flow out; and guide walls dividing the first and second air inlet openings into a plurality of sections and extending in a direction parallel with the air flow;

wherein the air mixing chamber is configured such that at least one of the first and second air streams hits against an inside wall of the air mixing chamber, flowing toward the outlet opening side after changing the direction of its flow;

wherein the guide walls being so provided as to alternately produce an air stratum of the first air stream and an air stratum of the second air stream as viewed from an outlet opening;

wherein a guide length a1 of a first one of the guide wall that guides a hitting air stream hitting against an inside wall of the air mixing chamber is set from 0.05 times or more to 0.5 times less than a length L1 from one of the inlet openings for introducing the hitting air stream to the inside wall of the air mixing chamber against which the hitting air stream hits;

wherein the angle of intersection γ between a direction of the main stream of air flowing out from the air outlet opening and the direction of a main stream of the first or second air streams is set in a range from −40 degrees or more to 40 degrees or less;

wherein a temperature of the first air stream is lower than that of the second air stream; and wherein the angle of intersection between the direction of the main stream of the outgoing air and the direction of the main stream of the second air stream becomes smaller than the angle of intersection between the direction of the main stream of the outgoing air and the direction of the main stream of the first air stream when air is blown out to the lower part of the vehicle interior.

12. An air-mixing air-conditioning system controlling a temperature of air blown into a vehicle interior after mixing a first air stream and a second air stream which differs in temperature, the system comprising:

an air mixing chamber having a first air inlet opening at which the first air stream is introduced, a second air inlet opening which opens in a direction intersecting the first air inlet opening for introduction of the second air stream, and an outlet opening at which the first air stream introduced through the first air inlet opening and the second air stream introduced through the second air inlet opening flow out; and guide walls dividing the first and second air inlet openings into a plurality of sections and extending in a direction parallel with the air flow;

wherein the air mixing chamber is configured such that at least one of the first and second air streams hits against an inside wall of the air mixing chamber, flowing toward the outlet opening side after changing the direction of its flow;

wherein the guide walls being so provided as to alternately produce an air stratum of the first air stream and an air stratum of the second air stream as viewed from an outlet opening;

wherein a guide length a1 of a first one of the guide wall that guides a hitting air stream hitting against an inside wall of the air mixing chamber is set from 0.05 times or more to 0.5 times less than a length L1 from one of the inlet openings for introducing the hitting air stream to the inside wall of the air mixing chamber against which the hitting air stream hits;

wherein the angle of intersection γ between a direction of the main stream of air flowing out from the air outlet opening and the direction of a main stream of the first or second air streams is set in a range from −40 degrees or more to 40 degrees or less;

wherein a temperature of the first air stream is lower than that of the second air stream; and wherein the angle of intersection between the direction of the main stream of the outgoing air and the direction of the main stream of the first air stream becomes smaller than the angle of intersection between the direction of the main stream of the outgoing air and the direction of the main stream of the second air stream when the air is blown out to the upper part of the vehicle interior.

* * * * *